United States Patent [19]

Strauss

[11] 4,031,059
[45] June 21, 1977

[54] LOW DENSITY ABLATOR COMPOSITIONS

[75] Inventor: Eric L. Strauss, Englewood, Colo.

[73] Assignee: Martin Marietta Corporation, Denver, Colo.

[22] Filed: Jan. 28, 1976

[21] Appl. No.: 652,906

Related U.S. Application Data

[63] Continuation of Ser. No. 435,234, Jan. 21, 1974, abandoned, which is a continuation-in-part of Ser. No. 243,954, April 15, 1972, abandoned, which is a continuation-in-part of Ser. No. 763,893, Sept. 30, 1968, abandoned.

[52] U.S. Cl. .................. 260/37 SB; 260/2.5 S; 427/387; 428/447
[51] Int. Cl.$^2$ ........................................ C08L 83/04
[58] Field of Search .......... 260/37 SB, 2.5 S, 2.5 B; 427/387; 428/447

[56] References Cited

UNITED STATES PATENTS

| | | |
|---|---|---|
| 2,797,201 | 6/1957 | Veatch et al. .................. 264/53 X |
| 3,317,455 | 5/1967 | Blome et al. .................. 260/2.5 FP |
| 3,344,104 | 9/1967 | Hyde .......................... 260/37 SB X |
| 3,429,838 | 2/1969 | Hersh .......................... 260/827 X |
| 3,506,607 | 4/1970 | Bobear .......................... 260/37 SB |
| 3,623,904 | 11/1971 | Ramseyer .................. 260/37 SB X |

*Primary Examiner*—Lewis T. Jacobs
*Attorney, Agent, or Firm*—Max L. Wymore

[57] ABSTRACT

Two types of highly filled, elastomeric silicone-base abiative compositions whose densities range from about 0.20 g/cc to about 0.30 g/cc. One type is a carbon char forming, high thermal efficiency ablator containing at least 92 percent by volume of low density filler with a total filler-to-resin volumetric ratio of at least 16 to 1. The additives comprise ground cork, silica or glass microspheres, phenolic microballons and silica and/or carbon fibers. The second type is a silica char forming, RF-transparent ablator containing at least 90 percent by volume of low density filler with a total filler-to-resin volumetric ratio of at least 11 to 1. The additives comprise silica or glass microspheres and silica fibers.

46 Claims, 15 Drawing Figures

■ SLA CONTROL
☐ 160°F AND VACUUM
▨ STERILIZATION

LOW DENSITY ABLATOR COMPOSITIONS

This application is a continuation of application Ser. No. 435,234, filed Jan. 21, 1974, now abandoned; which is a continuation-in-part of application Ser. No. 243,954, filed Apr. 15, 1972, now abandoned; which in turn is a continuation-in-part of application Ser. No. 763,893, filed Sept. 30, 1968, now abandoned.

Ablation is an effective and widely accepted thermal protection method for earth or planetary entry vehicles. Ablative materials are applied to the exterior of the temperature sensitive vehicle structure and isolate the structure material from the external hyperthermal entry environment. The ablation material in contact with the hot boundary layer undergoes physical and chemical changes; however, this degradation controls surface temperature and greatly restricts heat flow into the interior.

Planetary landers entering the Martian atmosphere at velocities of 12,000 to 15,000 ft/sec are expected to encounter heat pulses of up to 250 seconds duration, with heating rates up to 60 Btu/ft$^2$-sec. The total heat experienced during a Mars entry will be approximately 1500 Btu/ft$^2$. Dynamic pressures during entry will be low because of the low density of the Martian atmosphere. This entry environment is not too severe and existing ablative materials, which are designed primarily for more severe earth entry conditions, would yield an unnecessarily heavy heat shield for a planetary lander. In most instances, it was found that, if prior art ablators were used, the weight of the heat shield exceeded that of the vehicle structure. Thus, a significant heat shield weight reduction and corresponding payload increase could be achieved through the use of a more efficient ablative material. For example, on a 1640 pound vehicle, a 40% reduction in the heat shield would result in a 100 pound increase in payload. Charring ablators with densities falling in the range of 0.40 to 0.60 g/cc have been employed for ballistic satellite re-entry, manned spacecraft re-entry, lifting body re-entry, and similar applications. These ablators generally consist of one or more organic resins such as epoxy, phenol-formaldehyde, silicone or nylon and phenol-formaldehyde, plus low density additives such as phenolic, glass or silica microspheres, to achieve the desired low density. In lieu of low density fillers, foaming of the resin has been used to reduce ablator density. In these ablators, filler additions generally fall in the range of 55 to 65 percent of the ablator volume, well below the 90 percent plus of the ablator volume of this invention. Another type of low density charring ablator is corkboard in the density range of 0.30 to 0.55 g/cc. Corkboard has a lower thermal conductivity and higher specific heat than the polymer-base charring ablators and, thereafter, has a higher ablative efficiency than other ablative composites. Corkboard, however, undergoes severe shrinkage and cracking during ablation and, consequently, forms a structurally poor char. Table I compares the densities, thermal conductivities and specific heat values of the carbon char forming ablators of this invention (SLA-561 and SLA-741) and conventional low density ablators.

TABLE 1

PROPERTIES OF CHARRING ABLATORS

| Ablator | $\rho$, g/cm$^2$ | k, Btu-in. per hr-ft$^2$-° F. | Cp, Btu/lb-° F. | Ref. |
|---|---|---|---|---|
| Nylon-phenolic | 0.52 | 0.60–0.91 | 0.38 | A |
| Filled silicone MM* ESA-3560 HF | 0.51 | 0.71 | 0.29 | B |
| Filled silicone NASA-602 | 0.58 | 0.88 | 0.40 | C |
| Filled silicone DC-325 | 0.87 | 1.05 | 0.32 | D |
| Foamed silicone GE ESM 1004 | 0.62 | 1.24 | 0.33 | C |
| Filled epoxy Avco 5026 39-HC/G | 0.50 | 0.61 | 0.43 | A |
| Corkboard-Armstrong Insulcork 2755 | 0.53 | 0.40–0.60 | 0.50–0.60 | E |
| Corkboard-Armstrong 514 | 0.30 | 0.38 | 0.50 | |
| Superlight MM* SLA-561 | 0.225 | 0.36 | 0.30 | |
| Superlight MM SLA-741 | 0.215 | 0.36 | 0.32 | |

*MM - Martin Marietta

A. Wilson, R.G., "Thermophysical properties of six charring ablators from 140° to 700° K. and two chars from 800° to 3000° K.," NASA TN.D-2991 (October 1965).
B. Meltzer, J., Rosoff, J., Slaughter, J., and Sterhardt, J., "Structure and materials aspects of the PRIME flight test vehicle," AIAA/ASME Seventh Structures and Materials Conference (American Institute of Aeronautics and Astonautics, New York, 1966), pp. 398–422.
C. Dolan, C.M., "Study for development of elastomeric thermal shield materials," NASA CR-186 (March 1965).
D. "Dow Corning 325 Ablative Material", Engineering Products Div., Dow Corning, Midland, Mich., Bulletin: 08–109 (October 1964).
E. "Armstrong ablation material Insulcork 2755," Defense Div., Armstrong Cork Company, Lancaster, Pa.

It is also desirable in some instances that the heat shield for earth and planetary entry vehicles have a relatively high RF-transparency during and after the ablative process to facilitate signal transmission for radar altimeters and for communication. A silicone-base ablator whose density and thermal efficiency approach those of the carbon char forming ablators of this invention but with the additional characteristic of RF-transparency during and after ablation would be highly desirable for minimizing heat shield weights. Teflon (a trademark for tetrafluoroethylene resin), porous Teflon, fused silica and boron nitride have been used for this purpose, but these materials are heavy and difficult to attach to a vehicle or exhibit high ablation rates (porous Teflon). Table II compares the density, thermal conductivity and specific heat values of the ablator of this invention (SLA-220) and of conventional RF-transparent heat shield materials.

It is the primary object of the present invention to provide improved ablating compositions which overcome one or more of the disadvantages of the prior art ablators and have a lower density, a higher ablative efficiency, and a lower thermal conductivity, have a specific heat which is equal to or higher and form a sturdy, well-adhering, substantially crack-free char.

A further important object of the invention is to provide improved ablator compositions which have a density from about 0.20 g/cc to 0.30 g/cc and are considerably more efficient than conventional ablators.

A further object of this invention is to provide a composition to minimize heat flow into a body to be protected.

A further object of this invention is to provide a low density material resistant to aerodynamic heating.

TABLE II

PROPERTIES OF RF-TRANSPARENT HEAT SHIELD MATERIALS

| MATERIAL | $\rho$, g/cm$^3$ | k, Btu-in. per hr-ft$^2$-° F. | Cp, Btu/lb-° F. | Ref. |
|---|---|---|---|---|
| Teflon | 2.15 | 1.7 | 0.25 | A |
| Porous Teflon MM* | 0.51 | 0.42 | 0.25 | |
| Porous Teflon MM* | 0.71 | 0.47 | 0.25 | |
| Fused Silica | 2.21 | 12.0 | 0.17 | |
| Boron Nitride | 2.27 | 228 | 0.19 | C |
| Superlight MM* SLA-220 | 0.25 | 0.55 | 0.23 | |
| *MM - Martin Marietta | | | | |

A. Du Pont Teflon Tetrafluoroethylene Resin. Polychemical Department, E.I. Du Pont De Nemours & Company, Wilmington, Delaware, 1954.
B. A. Goldsmith, I. E. Waterman, H. J. Hirschhorn: Handbook of Thermophysical Properties of Solid Materials, Volume III: Ceramics. The Mac Millan Company, New York, 1961.
C. J. F. Lynch, C. G. Ruderer, W. H. Duckworth: Engineering Properties of Selected Ceramic Materials. The American Ceramic Society, Columbus, Ohio, 1966.

Another object of this invention is to provide a material having a uniform and desirable rate of ablation and a stable char.

A still further object of this invention is to provide a material that is resilient, has high tensile strength and good thermal shock resistance.

A further object of this invention is to provide a material which has a tensile elongation greater than two percent at room temperature and greater than one percent at −150° F.

Another important object of the invention is to provide a lightweight heat shield which is competitive on a weight basis with metallic radiative heat shields and provides higher reliability, lower cost and greater ease of fabrication.

A still further object of the present invention is to provide an improved ablator composition with improved transparency to radio frequency signals during and after ablation.

A further object of this invention is to provide a RF-transparent ablator which is lighter, less costly, and more easily installed than conventional ceramic or plastic materials with RF-transparency characteristics.

For a better understanding of the present invention, together with other and further objects thereof, reference is had to the following description taken in connection with the accompanying drawings, and its scope will be pointed out in the appended claims.

The super-light ablative compositions of this invention, which for convenience will be referred to as SLA, are highly filled substantially continuous elastomeric silicone resins containing at least about 90 percent by volume of low density filler. The filler may be treated with silane coupling agents such as Union Carbide A-1100 Silane and the like to improve bonding and wetting thereof with the resin. Also, the ablator may be contained in a fiberglass honeycomb support to reinforce and retain the char during ablation. The density of these compositions range from about 0.20 g/cc to about 0.30 g/cc.

Figure 3:
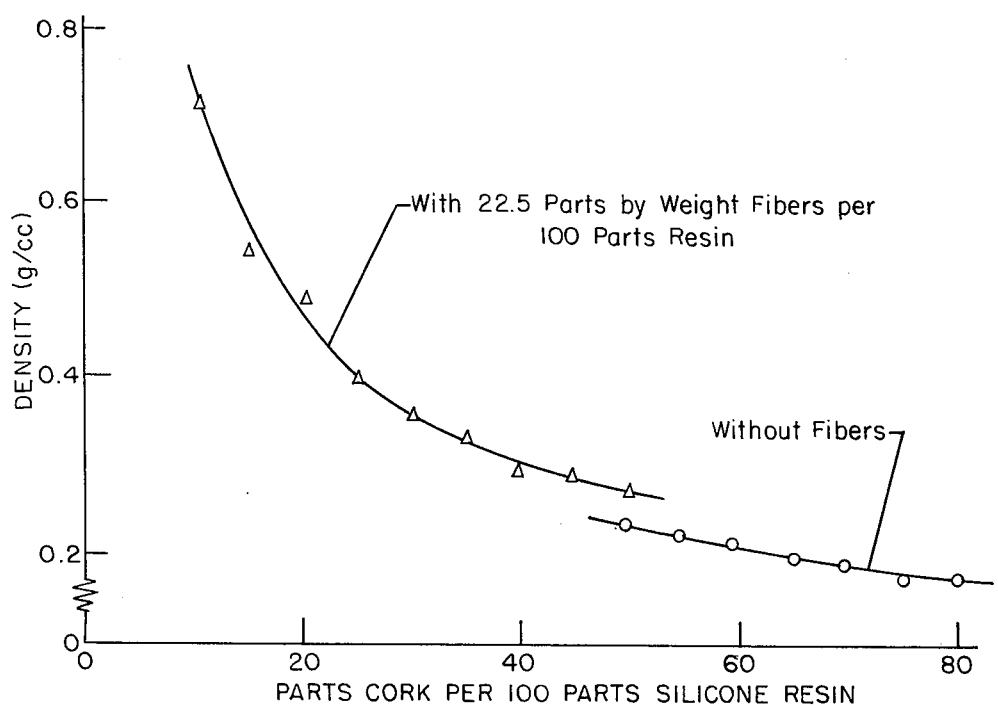
FIG. 3 is a graph illustrating the variation of density with cork content in a silicone resin-cork composition.
Figure 4:
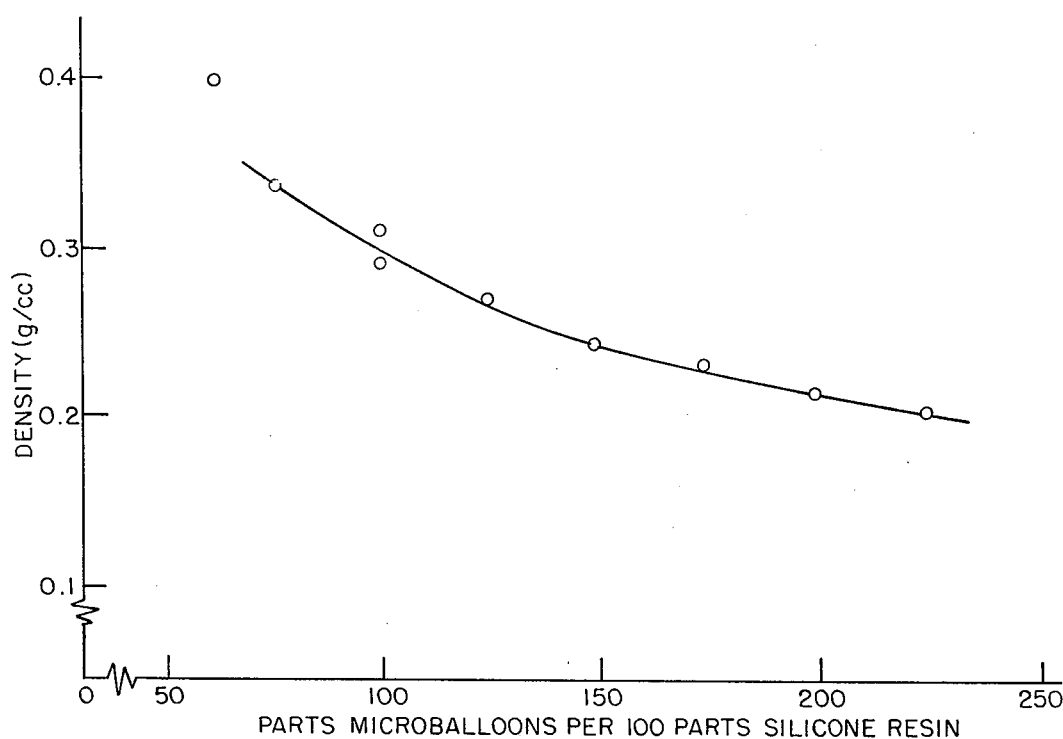
FIG. 4 is a graph illustrating the variation of density with microsphere content in a silicone resin-microsphere composition.

It was found that increasing the percent of low density filler (cork, phenolic microballoons, silica or glass microspheres) in an ablator composition decreased the density and thermal conductivity but also decreased the tensile strength and elongation of the resultant compositions. This is illustrated in Table III which list the density, thermal conductivity, tensile strength and elongation of five ablator compositions which use the same silicone resin system. FIG. 3 shows the variation of density with cork content in a silicone resin-cork composition and FIG. 4 shows the variation of density with microsphere content in a silicone resin — 50:50 mixture of phenolic microballoon and Eccosphere Si composition.

TABLE III

| Ablator | Density (g/cc) | Filler Content (Parts by volume per 100 parts resin) Low Density Fillers | Total Fillers | Tensile Strength (psi) | Percent Elongation | Thermal Conductivity at 300° F. (BTU-in./hr-ft²-° F.) |
|---|---|---|---|---|---|---|
| ESA-5500 | 0.88 | 88 | 133 | 140 | 36.0 | 1.56 |
| ESA-3560 | 0.48 | 153 | 155 | 150 | 9.5 | 0.68 |
| SLA-220 | 0.25 | 1176 | 1182 | 84 | 6.2 | 0.57 |
| SLA-561 | 0.225 | 1691 | 1702 | 61 | 2.5 | 0.36 |
| SLA-741 | 0.215 | 1779 | 1790 | 53 | 3.4 | 0.36 |

The uniqueness of the super-light ablators can be expressed by their filler/resin ratio where the filler comprises both low density constituents and fibers. Table IV shows that for the ablative compositions of this invention, the filler-to-resin volumetric resin is greater than 16 to 1, in the carbon char forming SLA-561 and SLA-741 formulations and greater than 11 to 1 in the RF-transparent SLA-220 composition. In state of the art ablators, this ratio is less than 2 to 1. The upper limit in filler content occurs when there is insufficient resin to wet all the filler particles, yielding a crumbly, low strength material.

TABLE IV

| Ablator | Filler-to-Resin Ratio Weight | Volume |
|---|---|---|
| SLA-561 | 3.06 | 17.02 |
| SLA-741 | 3.06 | 17.90 |
| SLA-220 | 2.23 | 11.84 |

Because of their high volumetric ratio of low density fillers-to-resin, processing of SLA ablators must be accomplished by the following unconventional techniques:

Mixing of the ablator constituents must be conducted with low shear equipment to prevent breakage of the microsphere particles;

Curing of the ablator must be conducted at a net pressure of less than one atmosphere to prevent particles compression and to control density;

The viscosity of the liquid silicone polymer must be less than 10,000 centipoise to wet and coat the filler particle surfaces.

The carbon char forming, high thermal efficiency ablative compositions contain fillers selected from ground cork, silica or glass microspheres, phenolic microballoons, and silica and/or carbon fibers. The relative quantities of silicone resin, ground cork and silica or glass microspheres are critical in obtaining an ablator of optimum density, strength, heat transfer resistance and char forming characteristics.

It was determined by experiment that a silicone resin-cork filler composition did not provide a suitable ablation material. A composition containing sufficient cork to reduce density to an acceptably low level yielded a structurally weak char during ablation. Additions of phenolic microballoons to the cork-resin mixture did not improve charring characteristics (Table V).

TABLE V

| Parts by Weight Cork per 100 Parts Silicone Resin | Parts by Weight Phenolic Microballoons per 100 Parts Silicone Resin | Density (g/cc) | Char Characteristics After Propane Torch Heating |
|---|---|---|---|
| 10 | — | .718 | Char with low shrinkage, |
| 25 | — | .399 | some surface porosity and small discontinous fissures.[1] |
| 40 | — | .295 | Severe char shrinkage |
| 50 | — | .278 | with deep cleavage |
| 25 | 15 | .387 | lines and craters |
| 35 | 5 | .355 | formed in char.[2] |
| 35 | 15 | .331 | |

[1]Acceptable char structure
[2]Unacceptable char structure

It was further found that additions of silica microspheres to a cork-silicone resin mixture or to a cork-phenolic microballoon-silicone resin mixture formed a low density ablative composition which, upon heating, decomposed to a dimensionally stable char.

TABLE VI

| Parts by Weight Cork per 100 Parts Silicone Resin | Parts by Weight Eccospheres Si per 100 Parts Silicone Resin | Density (g/cc) | Char Characteristics After Propane Torch Heating |
|---|---|---|---|
| 50 | 125 | .237 | Minor surface cracking |
| 50 | 150 | .228 | |
| 50 | 175 | .223 | |
| 75 | 200 | .212 | |

During the ablation process, cork and phenolic Microballoons char to a high carbon residue with accompanying volumetric shrinkage. The Eccosphere Si particles, on the other hand, do not undergo any chemical changes although some sintering of the silica particles occurs. Silica melting will occur at temperatures about 3000° F.

The optimum ratios of silicone resin-to-cork-to Eccospheres Si were established in a series of tests (Table VII) wherein 2½ in. diameter samples of equal weight (0.63 lb/ft$^2$) were subjectd to propane torch heating until their backface registered a temperature rise of 250° F. above ambient. The heat flux rate at the point of flame impingement was approximately 40 Btu/ft$^2$-sec. The lowest heat transfer (largest time for 250° F. backface temperature rise) was achieved with composition 62F. A reduction in the amount of cork (composition 59H) yielded greater heat flow through the ablator. Similarly, an increase in the amount of Eccospheres Si (and in the total filler content) increased the heat flow (compositions 62E and 62G). Composition 59C had the most stable char as evidenced by the least amount of char cracking. A reduction in the amount of Eccospheres Si (composition 59D) caused greater char cracking. Similarly, an increase in the amount of cork compositions 59G and 61A) caused greater char cracking.

Compositions 59C and 62F establish an envelop for suitable compositions. Both contain 300 parts by weight of low density fillers (cork, Eccospheres Si, phenolic microballoons) per 100 parts of resin. The weight ratio of Eccospheres-to-cork ranges from 0.57 in composition 62F to 1.20 in composition 59C. Both compositions contain 25 parts by weight phenolic microballoons per 100 parts resin. The phenolic microballoons, when dispersed through the silica microspheres tend to block radiative heat transfer through clumps of microsphere particles.

TABLE VII

CARBON CHAR ABLATIVE COMPOSITIONS

| Composition Number | Parts by weight per 100 Parts Resin[1] | | | Density[2] (g/cc) | Thickness for 0.63 lb/ft[2] | Time for 250° F. Backface Temperature Rise | Char Formation |
|---|---|---|---|---|---|---|---|
| | Cork | Eccospheres Si | Phenolic M.B. | | | | |
| 59D | 125 | 125 | 25 | .198 | .605" | 4 min. - 25 sec. | Initial cracking, no crack propagation |
| 59C[3] | 125 | 150 | 25 | .194 | .615" | 4 min. - 25 sec. | Faint cracking |
| 59H | 137½ | 100 | 25 | .190 | .623" | 5 min. - 10 sec. | Considerable cracking |
| 59F | 137½ | 125 | 25 | .193 | .619" | 4 min. - 48 sec. | Moderate cracking |
| 59G | 137½ | 150 | 25 | .194 | .622" | 4 min. - 25 sec. | Light cracking |
| 59B | 150 | 125 | 25 | .187 | .638" | 5 min. - 21 sec. | Moderate cracking |
| 61A | 150 | 150 | 25 | .184 | .645" | 5 min. - 7 sec. | Moderate cracking |
| 62F[4] | 175 | 100 | 25 | .178 | .670" | 6 min. - 26 sec. | Heavy cracking |
| 62E | 175 | 125 | 25 | .181 | .658" | 5 min. - 31 sec. | Moderate cracking |
| 62G | 175 | 150 | 25 | .180 | .667" | 5 min. - 32 sec. | Moderate cracking |

[1]No fiber additions;
[2]Samples molded without pressure;
[3]SLA-561 composition;
[4]SLA-741 composition The preferred compositions of the carbon char forming super-light ablators, according to the present invention, are set forth in the following tables:

Table VIII

| Ingredients | SLA-561 (0.225 g/cc) | | |
|---|---|---|---|
| | Weight Percent | Volume Percent | Parts By Volume |
| Resin (0.995 g/cc) | 24.57 | 5.55 | 100.00 |
| Silica Fibers (2.20 g/cc) | 2.92 | 0.30 | 5.40 |
| Carbon Fibers (1.85 g/cc) | 2.34 | 0.30 | 5.40 |
| Eccospheres Si (0.18 g/cc) | 35.10 | 43.90 | 790.99 |
| Phenolic Microballoons (0.092 g/cc) | 5.85 | 14.35 | 258.55 |
| Cork (0.186 g/cc) | 29.22 | 35.60 | 641.51 |
| | 100.00 | 100.00 | 1801.85 |

TABLE IX

| Ingredients | SLA-741 (0.215 g/cc) | | |
|---|---|---|---|
| | Weight | Volume | Parts By Volume |
| Resin (0.995 g/cc) | 24.57 | 5.30 | 100.00 |
| Silica Fibers (2.20 g/cc) | 2.92 | 0.28 | 5.28 |
| Carbon Fibers (1.85 g/cc) | 2.34 | 0.28 | 5.28 |
| Eccospheres Si (0.18 g/cc) | 23.40 | 27.90 | 580.00 |
| Phenolic Microballoons (0.092 g/cc) | 5.85 | 13.64 | 257.35 |
| Cork (0.186 g/cc) | 4.92 | 47.20 | 890.56 |
| Porosity (voids) | — | 5.40 | 101.88 |
| | 100.00 | 100.00 | 1890.35 |

The relative particle size of the low density filler constituents is another important feature of the SLA-561 and SLA-741 ablator compositions. The ground cork used in SLA ablators consists of irregularly-shaped particles whose maximum dimension ranges from 0.0165 to 0.0331 inch. Ninety percent of the cork weight consists of particles larger than 0.0234 inch. The phenolic microballoons and Eccospheres Si particles, on the other hand, are nearly spherical and range in diameter from 0.0030 to 0.0080 inch. Ninety percent of the weight of phenolic Microballoons and Eccosphere Si consists of particles greater than 0.0059 inch in diameter. Thus, the volume of the cork particles is approximately 15 times that of the phenolic Microballoon and Eccosphere Si particles. In the SLA-561 ablator, the phenolic Microballoon and Eccospheres Si particles tends to fill the interstices between cork particles. In SLA-741, the ratio of spherical particles-to-cork particles has been reduced and the amount of spherical particles is insufficient to fill the interstices between cork particles. As a result, SLA-741 contains 5.40% more porosity than does SLA-561.

In addition to the total filler-to-resin ratio (Table IV) the composition of the high efficiency super-light ablators is specified by the following materials parameters:
The low density filler content;
The ratio of hollow spherical particles-to-cork;
The ratio of silica or glass microspheres-to-cork.

TABLE X

| Ablator | Low Density Filler Weight Percent | Low Density Filler Volume Percent |
|---|---|---|
| SLA-561 | 70.17 | 93.85 |
| SLA-741 | 70.17 | 94.14 |

TABLE XI -continued

| Ablator | Hollow Spherical Particles/Cork | |
|---|---|---|
| | Weight Ratio | Volume Ratio |
| SLA-561 | 1.40 | 1.64 |
| SLA-741 | 0.72 | 0.88 |

TABLE XII

| Ablator | Silica Microspheres/Cork | |
|---|---|---|
| | Weight Ratio | Volume Ratio |
| SLA-561 | 1.20 | 1.23 |
| SLA-741 | 0.57 | 0.60 |

The ratio of Eccospheres Si-to-cork used in SLA-561 (1.2 on a weight basis) has been found to be optimum for formation of a durable, low shrinkage char during ablation. The Eccosphere Si-to-cork weight ratio of 0.57 used in SLA-471 represents a lower limit for a useful ablator.

RF-transparent ablative compositions contain fillers selected from silica or glass microspheres and silica fibers. Such compositions form a predominantly siliceous rather than carbonaceous char. The relative quantities of silicone resin, catalyst and silica or glass microspheres are critical in obtaining an ablator or optimum density, strength, elongation, heat transfer resistance, char forming characteristics and RF-transparency.

In a composition comprising silicone resin and silica fillers, only the organic side groups (methyl, phenyl, vinyl) attached to the -Si-O-Si-O- backbone of the silicone polymer contain carbon atoms. When chemically bonded, these carbon atoms do not interfere with RF-transmission; however, upon heating, the organic side groups break down and free carbon can be formed. The free carbon does attenuate RF transmission. To minimize the amount of free carbon in the ablator char, it is necessary to use a minimum amount of the silicone resin. This minimum is the amount necessary to wet out all the fillers and allow the material to be consolidated during the cure process. An insufficient amount of resin yields a crumbly, low strength material.

The optimum ratio of silicone resin-to-curing agent-to-silica microspheres was established in a series of experiments. Samples, 0.50 in. thick, were tested under radiant heating for 60 seconds at 22.5 Btu/ft$^2$-sec and for 95 seconds at 11.4 Btu/ft$^2$-sec and the nature the char was noted (Table XIII). At the higher heating rate, char cracking occurred with Eccosphere Si loadings of 200 parts by weight per 100 parts silicone resin and less. The best char was obtained with 220 parts by weight Eccospheres Si per 100 parts silicone resin and 6 percent curing agent. Similar results were obtained for tests at the lower heating rate.

TABLE XIII

RADIANT HEAT TESTING OF RF-TRANSPARENT ABLATORS

| Sample | Parts By Weight Per 100 Parts Sylgard 182 Resin | | | Density (g/cc) | Char Formation |
|---|---|---|---|---|---|
| | Catalyst | Eccospheres | Si Fibers | | |
| 60 seconds at 22.5 Btu/ft$^2$-sec | | | | | |
| 118 | 10 | 150 | 15 | .293 | Dome-shaped surface with cracks. Severe char laminations in cross-section. |
| 99 | 10 | 200 | 30 | .265 | Black char for depth of 7/32 inch. Swelling increased height by 5/32 inch. |
| 180-3 | 6 | 200 | 30 | / | Uniform char color. Severely delaminated. |
| 126 | 6 | 200 | 15 | .268 | Dome-shaped surface with cracks. Brittle and delaminated char. |
| 100 | 10 | 220 | 15 | .255 | Grey surface with some surface cracks. |
| 180-2 | 6 | 220 | 15 | / | Uniform char. Flat surface. Slight surface cracking. Concave bottom. |
| 133 | 6 | 250 | 15 | .231 | Dome-shaped surface with small cracks. Hard char cap. Delamination at pyrolysis zone. |
| 95 seconds at 11.4 Btu/ft$^2$-sec. | | | | | |
| 121 | 6 | 125 | 15 | / | Dome-shaped surface. Delaminated char. |
| 118 | 10 | 150 | 15 | .293 | Dome-shaped surface. Delaminated char. |
| 122 | 6 | 150 | 15 | / | Dome-shaped surface. Attached char. |
| 123 | 6 | 175 | 15 | / | Dome-shaped surface. Attached char. |
| 180-3 | 6 | 200 | 30 | / | Uniform flat surface, top and bottom. |
| 180-1 | 6 | 200 | 15 | .260 | Uniform crack-free surface. Concave bottom. No delamination. |
| 100 | 10 | 220 | 15 | .255 | Light gray surface. Charred to depth of 0.33 inch. |
| 180-2 | 6 | 220 | 15 | / | Uniform crack-free surface; flat bottom. No delamination. |

One way to compensate for char shrinkage and sample warpage during prolonged heating is to score the ablator surface with a knife or the like into a series of perpendicular striations. Scoring cuts in ⅜ to ⅝ inch thick test samples were 3/16 inch deep and in a ¼ inch square grid pattern. The scoring cuts tend to open up as a result of char shrinkage; however, they prevent random char cracking and bowing of the ablator due to shrinkage and differential expansion or contraction between the ablator and its char.

In further tests, 2½ in. diameter samples of equal weight (0.63 lb/ft$^2$) were subjected to propane torch heating until their backface registered a temperature rise of 250° F. above ambient (Table XIV). The heat flux rate at the point of flame impingement was approximately 40 Btu/ft$^2$-sec. The carbonaceous spot at the point of flame impingement was found to be smaller in the sample containing 220 parts by weight Eccospheres Si per 100 parts resin than in a sample containing 200 parts Eccospheres Si. Heat transfer through the two samples was approximately equal.

Figure 5:
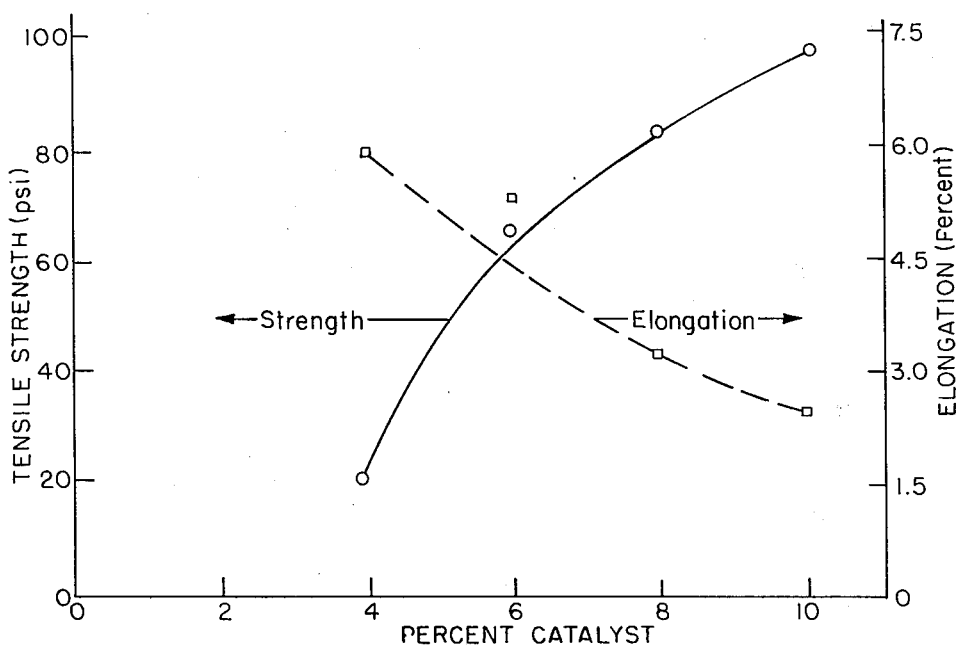
FIG. 5 is a graph illustrating the variation of tensile strength and elongation with catalyst concentration in a RF-transparent ablator composition.

Effects of composition of RF-transparent ablators on strength and elongation were established by tensile testing (Table XV). Tensile strength decreases with increasing Eccospheres Si concentration while elongation tends to increase. Molding pressure between 2.5 and 7.5 psi appear to have little effect on density and on tensile strength, but elongation tends to increase with increasing molding pressure. An increase in catalyst concentration increases density and tensile strength but reduces elongation. Since both a high tensile strength and a high elongation are desired, the 6% catalyst concentration used in SLA-220 represents a compromise as illustrated in FIG. 5.

The sintered char which forms below the dark char does not contain free carbon and is therefore transparent to RF signals.

The electrical properties of 0.150 inch thick samples of SLA-220 were measured before and after heating for 60 seconds with a propane torch. The dielectric constant was 1.65 before heating and only increased to 1.78 after heating. The loss tangent increased from $2.4 \times 10^{-3}$ to $5.7 \times 10^{-3}$. For the carbon char forming

TABLE XIV

PROPANE TORCH TEST RESULTS FOR RF-TRANSPARENT ABLATORS

| Sample No. | Parts By Weight Per 100 Parts Sylgard 182 Resin | | | Density* (g/cc) | Thickness for 0.63 lb/ft² (in) | Time for 250° F. Backface Temperature Rise | Char Formation |
|---|---|---|---|---|---|---|---|
| | Catalyst | Eccospheres | Si Fibers | | | | |
| 99-1 | 10 | 200 | 30 | .264 | .457 | 1 min:37 sec | No surface cracks. ⅝ in. diameter carbonaceous spot in center. |
| 100-1 | 10 | 220 | 15 | .258 | .468 | / | Carbonaceous spot in center surrounded by tan and light brown rings. |
| 101-1 | 6 | 220 | 15 | .246 | .488 | 1 min:38 sec | No surface cracks. ⅝ in. carbonaceous spot in center |

*Clamping pressure during ablator cure.

TABLE XV

EFFECTS OF MATERIALS VARIABLES ON PROPERTIES OF RF-TRANSPARENT ABLATORS

| Materials Variable | Parts By Weight Per 100 Parts Sylgard 182 Resin | | | Molding Pressure (psi) | Density (g/cc) | Tensile Strength (psi) | Elongation (%) |
|---|---|---|---|---|---|---|---|
| | Catalyst | Eccospheres | Si Fibers | | | | |
| Eccosphere Concentration | 6 | 125 | 15 | / | .307 | 119 | 4.1 |
| | 6 | 125 | 15* | / | .319 | 103 | 4.1 |
| | 6 | 150 | 15 | / | .281 | 106 | 4.2 |
| | 6 | 175 | 15 | / | .276 | 95 | 4.7 |
| | 6 | 200 | 15 | / | .256 | 73 | 4.1 |
| | 6 | 200 | 15* | / | .263 | 80 | 5.1 |
| | 6 | 220 | 15 | / | .235 | 67 | 5.5 |
| | 10 | 125 | 15 | / | .314 | 120 | 2.5 |
| | 10 | 150 | 15 | / | .292 | 126 | 2.6 |
| Molding Pressure | 6 | 220 | 15 | 2.5 | .232 | 51 | 3.6 |
| | 6 | 220 | 15 | 5.0 | .233 | 58 | 4.0 |
| | 6 | 220 | 15 | 7.5 | .224 | 56 | 4.2 |
| Catalyst Concentration | 10 | 220 | 15 | / | .240 | 99 | 2.5 |
| | 8 | 220 | 15 | / | .235 | 85 | 3.3 |
| | 6 | 220 | 15 | / | .235 | 67 | 5.5 |
| | 4 | 220 | 15 | / | .222 | 21 | 6.2 |

*Fibers treated with a Silane Coupling Agent

The preferred composition of the RF-transparent super-light ablator, according to the present invention, is set forth in the following table:

TABLE XVI

| | SLA-220 (0.250 g/cc) | | |
|---|---|---|---|
| Ingredients | Weight Percent | Volume Percent | Parts By Volume |
| Resin (0.995 g/cc)* | 31.0 | 7.8 | 100.00 |
| Silica Fibers (2.20 g/cc) | 4.7 | 0.5 | 6.41 |
| Eccospheres Si (0.18 g/cc) | 64.3 | 91.7 | 1175.64 |
| | 100.00 | 100.00 | 1282.05 |

*Including 6% catalyst

For the SLA-220 composition, the low density filler content is 64.3% by weight and 92.7% by volume.

The RF-transparent compositon designated SLA-220 hs a density of 0.25 g/cc and decomposes to $SiO_2$ when subjected to thermogravimetric (TGA) analysis. However, during ablation, the gaseous decomposition products formed in the pyrolysis zone undergo further cracking while passing through the hot silica char. This secondary decomposition is accomplished by deposition of small amounts of carbon. Carbon deposition during ablation increases with ablator surface temperature and, therefore, with heat flux.

Figure 6:
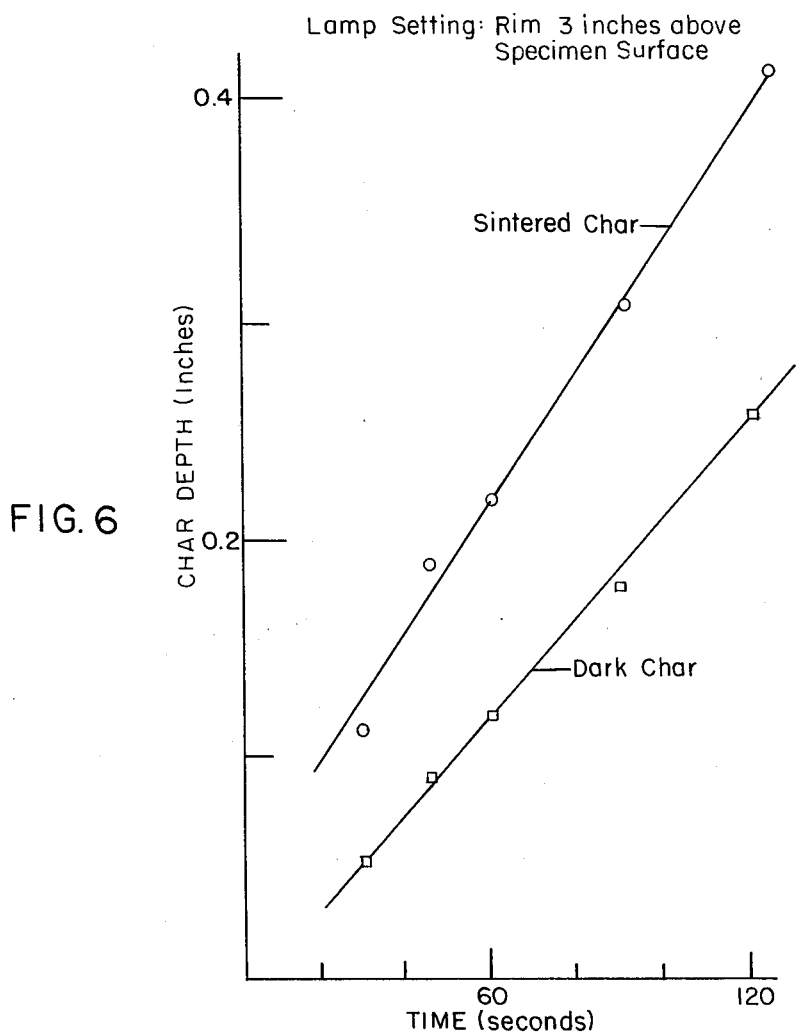
FIG. 6 is a graph illustrating the variation of char depth with length of exposure to a radiant heat flux of 11.4 Btu/ft$^2$-sec.

FIG. 6 shows the increase in char depth with exposure time for SLA-220 exposed to a radiant heat flux of 11.4 Btu/ft²-sec. The dark char contains some free carbon which will attenuate RF signal transmission.

SLA-561 ablator, the dielectric constant increased from 1.84 to 2.89 and the loss tangent from $1.7 \times 10^{-3}$ to $12.0 \times 10^{-3}$.

To determine whether carbon deposition in SLA-220 char resuls in excessive signal attenuation, 5- × 8- × ½-inch test panels were interposed between a signal generator and a receiver, and decibel loss was measured. One SLA-220 panel was an uncharred control; the other two panels had been charred by exposure to a 11.4 Btu/ft²-sec radiant heat flux for 45 and 95 sec, respectively. Char depth and signal attenuation are listed in Table XVII below.

TABLE XVII

RADIO-FREQUENCY SIGNAL ATTENUATION FOR SLA ABLATORS AT 10,000 Mc

| SLA-220 | | SLA-561 | |
|---|---|---|---|
| Char Depth, in. | Attenuation, db | Char Depth, in. | Attenuation, db |
| 0 | −0.5 | 0 | −1.8 |
| 0.17 | −0.8 | 0.13 | −1.8 to −3.0 |
| 0.33 | −1.6 | 0.25 | −2.0 to −6.7 |
| | | 0.38 | −4.5 to −8.0 |

Similar tests were also conducted on the SL-561 superlight ablator which forms a carbon char during ablation. A maximum signal loss of 3 db under the test conditions employed (one way loss) is considered acceptable. Signal loss for charred SLA-561 exceeded this limit value but signal loss for charred SLA-220 samples fell within acceptable limits.

Figure 7:
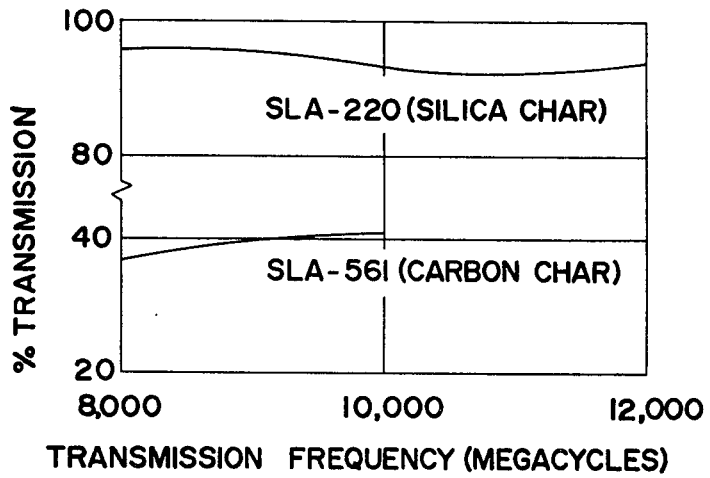
FIG. 7 is a graph illustrating percent transmission vs. frequency for charred ablators.

FIG. 7 shows percent transmission of charred SLA ablators as a function of signal frequency. Percent transmission is defined by the expression: signal attentuation = 10 log (% transmission/100). A 50% transmission corresponds to a signal loss of 3 db and is, therefore, the minimum acceptable value. Signal transmission of the carbon char forming SLA-561 (0.25 inch char depth) fell below 50%, while that of SLA-220 (average of 0.17 and 0.33 inch char depth) exceeded 90% over the microwave range of 8,000 to 12,000 Mc. These tests indicate that SLA-220 is suitable as an RF-transparent ablator for Mars lander missions.

The silicone resins which can be used in the SLA ablators are transparent, low viscosity, solventless silicone liquids that cure with the addition of a curing agent to form rubberlike, tough, transparent solids. Generically, these resins fall in the family of "organopolysiloxane polymers." The chemical structure consists of a -Si-O-Si-O-Si-O- backbone with organic groups such as methyl, phenyl or vinyl attached to the silicon atoms. Some cross linking between adjacent polymer chains occurs. In organopolysiloxanes containing vinyl groups, cross linking occurs through the vinyl groups. Depending on the organic groups present, the organopolysiloxanes may be more specifically identified as dimethylpolysilozanes methyl-phenyl polysiloxanes or methyl-phenyl-vinyl polysloxanes.

One of the requirements for SLA ablators is that the viscosity of the liquid resin not exceed 10,000 centipoise. Resins with higher viscosities will not adequately wet the large volume of low density fillers.

Several commecially available silicone elastomers can be used in SLA ablators.

RTV-655 (methyl-phenyl-vinyl polysiloxane), General Electric Company.
Color —Clear, Light Straw
Viscosity at 77° F —5,000 cps
Solids Content —100%
Specific Gravity at 77° F. —1.07
Refractive Index —1.435
Properties of cured material (one part curing agent to 10 parts resin, cured 4 hours at 150° F.
Color —Transparent, Clear, Light Straw
Specific Gravity —1.07
ASTM-D-676 Durometer, Shore A —35
Tensile Strength —850–1,000 psi
Elongation —150%
RTV-602 (dimethyl polysiloxane), General Electric Company.
Color —Clear
Viscosity at 25° C. —800–1,500 cps
Solids Content —100%
Specific Gravity at 25° C. —0.995
Refractive Index —1.406
Properties of cured material
Color —Clear, Colorless
Specific Gravity at 25° C. —0.995
Durometer, Shore A 15
Brittle Point —Below −90° F.
RTV-615 (dimethyl polysiloxane), General Electric Company
Color —Clear
Viscosity at 25° C. —3,500 cps
Solids Content —100%
Specific Gravity at 25' C. —1.02
Refractive Index —1.406
Properties of cured material (4 hours of 65° C.)
Color —Transparent, Clear
Specific Gravity —1.02
ASTM-D-676 Durometer, Shore A –35
Tensile Strength —800–1,000 psi
Elongation —100% -150%
Brittle Point —Below -90° F.
Sylgard 182 (methyl, low phenyl polysiloxane), Dow Corning Corporation.
Color —Light Straw
Specific Gravity at 25° C. (77° F.) —1.05
Viscosity at 25° C. —5,000 cps
Silicone Resin Content —100%
Properties of cured material (4 hours at 65° C.)
Color —Transparent, Colorless to Light Straw
Specific Gravity —1.05
Hardness, Shore A —40
Brittle Point —Below −70° C.

The phenolic Microballoons used in this invention are small hollow microspheres of phenolformaldehyde resins identified as Microballoon BJ0-0930, available from Union Carbide Company, Niagara Falls, New York. In U.S. Pat. No. 3,296,153 issued to Snogren the use of Union Carbide Company Microballoon BJ0-0930 is cited. The process for producing resinous hollow particles suitable for the practice of this invention has been disclosed and described in U.S. Pat. No. 2,797,201, Veatch et al, June 25, 1957. Nitrogen filled phenolformaldehyde spheres sold under the trade designation Microballoons, a product of Union Carbide Corporation are also identified in U.S. Pat. No. 3,365,358, M. C. Hutchins issued Jan. 23, 1968.

The properties of Phenolic Microballoons BJ0-0930 are:
Apparent Density, g./500 cm.$^3$—52, maximum lb./ft.$^3$ 6.5, maximum
Density (liquid displacement), g./cm.$^3$ 0.21–0.25, maximum
Flotation in Toluene-"Duoponol" solution—No less than 90% of the Microballoons shall float
Particle Size, percent on 40 mesh—0.2, maximum
Moisture Content, percent —4.0, maximum.

The Eccospheres Si used in the ablators of this invention are silica microspheres available from Emerson and Cuming, Inc. of Canton, Massachusetts, having the following properties:
Physical Form—Free flowing powder
Particle Size—30 to 125 microns
Wall Thickness—About 2 microns
Chemical Composition—Over 95% $SiO_2$
Bulk Density—11 lbs./cu. ft. (0.18g/cc)

True Particle Density—About 16.2 lbs./cu. ft. (0.26 g/cc)
Temperature Capability—2500° F. (1400° C.)
Permeability of Particle Wall—Impermeable to water and other liquids.
Thermal Conductivity of Loosely—0.03 BTU/hr/ft$^2$/°F/ft at 0° F.
Packed Material—0.04 BTU/hr/ft$^2$/°F/ft at 300° F.
Compressive Strength under Hydrostatic Loading—at least 1,000 psi
Dielectric Constant (dry), 1 mc to 8800 mc—approx. 1.16
Dissipation Factor (dry), 1 mc to 8800 mc—approx. 0.0005.

Other suitable SiO$_2$-base microspheres and their properties also available from Emerson and Cuming are:

IG-101

Composition—Sodium Borosilicate Glass
Bulk Density—12–15 lb/ft$^3$
True Density (liquid displacement)—21 lb/ft$^3$
Average Particle Size — 65 microns
Melting Point — 900° F.

FT-102

Bulk Density — 0.16 g/cc (10 lb/ft$^3$) True Particle Density — 0.26 g/cc (16 lb/ft$^3$
Melting Point — approximately 2000° F.
Particle Size Range — 10–250 microns.

The silica fiber used in the ablators of the invention have the following properties and are available from the H. I. Thompson Fiber Glass Co., Known as HITCO F-100-½ Refrasil fibers:

Refrasil F-100-½

Composition — Vitreous, up to 99% SiO$_2$ content
Fiber Length—½ inch
Fiber Diameter—0.0004 inch nominal
Melting Point—in excess of 3000° F.
An alternate suitable silica fiber is Astroquartz Chopped Fiber, available from J. P. Stevens and Company, Inc.

Astroquartz Chopped Fiber

Composition—Pure quartz; SiO$_2$ content of 99.99%
Fiber Length—½ inch
Fiber Diameter—0.0004 inch
Softening Point—3032° F.

The carbon fiber suitable for use in the ablators of this invention is CFA-1/4, available from H. I. Thompson Company (HITCO) with the following properties:

CFA-1/4

Composition—94% carbon with an amorphous structure
Fiber Length—0.2 inch
Fiber Diameter—.0003 inch
Specific Gravity—1.8–1.9.
As an alternate, HITCO CFA-½(0.5 inch length) can be used. Other alternate carbon fibers are VFA Carbon Fibers produced by Union Carbide Corporation and Carbon Grade CY-2F Chopped Fibers produced by Basic Carbon, A Carborundum Company.

VFA Carbon Fiber

Composition—95% minimum carbon assay
Density—1.75–1.95
Fiber Length—¼ inch
Fiber Diameter—.0003 inch.

CY-2F Chopped Carbon Fibers

Composition—99.5% minimum carbon content
Fiber Length—¼ or ½ inch
Fiber Diameter—0.0003 inch.

Cork suitable for use in the ablators of this invention is milled ground cork, 20–40 mesh, obtained from the Armstrong Cork Company of Lancaster, Pennsylvania. The ground cork had 90% of the cork weight consisting of cork particles larger than 0.0234 inch.

Processing of the SLA ablators requires considerable care and special techniques in order to prevent crushing of the low density fillers. Blending of the fillers and mixing the liquid resin into the fillers must be achieved with low shear mixing equipment such as a Ross Double Planetary Mixer or a Hobart Mixer to avoid increase in density due to crushing of the particles.

Curing of SLA ablators is conducted at less than atmospheric pressure by applying a vacuum of 15 inch Hg (7.4 psi). Examples of the procedures for producing SLA-561 and SLA-220 ablation materials are as follows:

EXAMPLE 1

PROCEDURE FOR PRODUCING SLA-561 ABLATION MATERIAL

Materials, equipment and techniques for mixing SLA-561 ablation material are as follows:

| Materials | |
| --- | --- |
| RTV 655 Resin | General Electric |
| RTV 655 Curing Agent | Silicone Products Dept. Waterford, N.Y. |
| Ground Cork 20/40 Primed Milled Ground | Armstrong Cork Co. Lancaster, Pa. |
| Silica microspheres Eccospheres | Emerson & Cuming, Inc. Canton, Mass. |
| Grade Si Microballoons, Phenolic Grade BJO-0930 | Union Carbide Corp. Plastics Division Moorestown, N.J. |
| Silica Fibers Refrasil F 100½ | H. I. Thompson Fiber Glass Co. 1600 West 135th Street Gardena, California |
| Chopped Carbon Fibers CFA ¼ | H. I. Thompson Fiber Glass Co. 1600 West 135th Street Gardena, California |
| 1100 Silane | Union Carbide Corp. Silicones Division 270 Park Avenue New York, New York |
| Distilled Water | Commercial |
| Acetone (for cleaning) | Commercial |
| Zinc chromate Paste | Commercial |
| Mylar or P.V.A. Sheet .003" thick | Commercial |

Equipment

Ross double planetary mixer, Model 10 HDM
   10 gallon capacity
Hobart Mixer, Model N-50
   1 gallon capacity
   Suitable for 100 gram resin base mix
Hobart Mixer, Model A-200
   5 gallon capacity
   Suitable for 300 gram resin base mix
Graduated Cylinders—100 cc, 1000 cc, 5000 cc
Spatula, stainless steel or plastic—5 inch
   Suitable for 100 to 300 gram mix
Glass trays — 10 × 6 × 2 inch and 12 × 18 × 2.5 inch Suitable for 100 to 300 gram mix
Paper cups — 6 oz. and 32 oz.
Standard vacuum pump with gauge
Circulating oven — 400° F. size governed by size of vacuum bag assembly)
¼ inch thick aluminum plate
With area governed by vacuum bag assembly (Base for vacuum bag assembly)
Balance —±0.05 g accuracy
Size of all equipment shall be proportional to amount of resin base mix required.

Procedure

A. Ingredients for 100 g resin base mix
100 g 655 resin
10 g 655 curing agent
125 g ground cork 20/40 mesh
150 g silica spheres (Si grade)
25 g microballoons, phenolic
22.5 g treated fibers B. Treatment of SiO$_2$ and carbon fibers with silane coupling agent
1. Silica fibers and chopped carbon fibers in a weight ratio of 10.5 parts carbon to 12 parts silica are placed in Hobart mixer model N-50 and mixed with spatula until a uniform blend is formed. For treating 22.5 g of mixed fibers, 750 ml of distilled water are poured on top of fiber blend and mixed in Hobart blender at low speed for one hour.
2. 3.45 grams of silane are added to 70 cc of distilled water (15 minutes before hour is up on B1) and agitated thoroughly three times (every 5 minutes)
3. Pour B2 into B1 slowly (approximately 10 min.) while Hobart is running at low speed. Continue mixing for 2 hours longer (total time 2 hours 10 min.)
4. Let mixture settle from 5 to 15 minutes and decant.
5. Dry treated fibers in air circulating oven at 230° F. for 16 hours.

C. Mixing of SLA-561 (100 g base resin mix)
1. In paper cup, weight 100 grams 655 resin. Add 10 grams 655 curing agent and mix by spatula until thoroughly mixed (5 to 10 minutes). (Alternate way, mix in Hobart N-50 for 3 min.)
2. Place 22.5 grams of treated fibers from B5 above into Hobart N-50 and spread 110 grams catalyzed resin uniformly over fibers. Mix for 2 minutes at low speed in Hobart N-50, then 2 minutes at medium speed and 26 minutes at high speed. Mixture should have high viscosity comparable to molasses. Periodically scrape the sides of the mixing bowl to insure uniform mixture. (Every 3 min.)
3. Weight 125 grams cork, 150 grams silica spheres and 25 grams phenolic Microballoons and mix by hand until uniform in color.
4. Mix C3 into C2 with spatula for several minutes (less dust will splash when starting Hobart), then continue mixing for 30 minutes in Hobart mixer. Use splash guard on Hobart and mix at low speed.

D. Method for fabricating SLA-561 into formed blocks by direct pressure.
1. Size of tool governed by part desired. Tool may be made of aluminum and shall consist of a base, removable side walls and a close fitting, yet freely sliding ram.
2. Place suitable quantity of SLA-561 evenly into the tool. The weight of material shall be calculated from the area of the mold cavity, the desired height of the part and the nominal density of SLA-561 (0.225 g/cc.). Use of Mylar separation sheet on bottom of cavity.
3. Tamp material in place by repeatedly applying a force of approximately three pounds across top surface with a 2 × 4 × 10 inch long wooden block. Tamped surface shall be flat and uniform.
4. Place ram on top of material and apply pressure of one to two psi. Remove ram and inspect material, to insure that material is evenly tamped and surface is free of voids. Cover top of material with Mylar separation sheet and replace ram.
5. Install tool in oven. Place weights on ram such that pressure on material is 7.5 psi. Weights should be centered on ram to insure a uniform pressure distribution on the material. Cure for 16 hours at 250° F.
As an alternate method, the tool can be installed in a heated platen press. The press shall be closed such that a pressure of 7.5 psi is exerted on the material. The sides of the tool shall be insulated and the material cured in the press for 16 hours at 250° F.
6. After curing, remove SLA-561 from mold by withdrawing ram and removing sides of the tool.

E. Method for fabricating SLA-561 into formed blocks by vacuum.
1. Size of tool governed by part desired. Tool may be made of aluminum and shall consist of a base and removable side walls.
2. Same as D2.
3. Same as D3.
4. Using a 1 inch diameter roller 14 inch long, roll over top surface using edges of tool as bearings for roller (insures evenly packed material).
5. Place additional SLA-561 evenly on top of packed material (the weight of additional material shall be calculated from the area of the mold cavity, a height of ⅛ inch and the nominal density of SLA-561 (0.225 g/cc).
6. Vacuum bag part. (Normal vacuum bag technique) and apply 15 inches Hg. (7.4±1 psi) and cure in oven at 250° F. for 16 hours while under 15 inches Hg. vacuum. Vacuum of 15 inches Hg. can be applied by using a tee with a valve on open end of vacuum line and valve adjusted until 15 inch Hg. on gauge is constant.
7. After curing, remove SLA-561 from mold by removing sides of tool.

The density of the cured SLA-561 is 0.225±0.010 g/cc.

EXAMPLE 2

PROCEDURE FOR PRODUCING SLA-220 ABLATION MATERIAL

Materials, equipment and technique of mixing SLA-220 ablation material are as follows:

| | Materials |
|---|---|
| Sylgard 182 resin | Electronic Product Division |
| Sylgard 182 curing agent | Dow Corning Corporation |
| | Midland, Michigan |
| Silica fibers | H. I. Thompson Fiber Glass Co. |
| Refrasil F-100½ | 1600 West 135th Street |
| | Gardena, California |
| Silica microspheres | Emerson and Cuming, Inc. |
| Eccospheres Grade Si | Canton, Massachusetts |
| Zinc chromate paste | Commercial |
| Mylar sheet, .003" thick | Commercial |

Equipment

Hobart mixer Model N-50
Suitable for 100 gram resin base mix.
Hobart mixer Model A-200
Suitable for 300 gram resin base mix.
Spatula, stainless steel or plastic — 6 inch
Suitable for 100 to 300 gram resin base mix.
Paper cups 6 oz. and 32 oz.
Standard vacuum pump with gauge
Circulating oven — 400° F.
(Size governed by size of vacuum bag assembly)
¼ inch aluminum plate with area governed by vacuum bag assembly. (Base for vacuum bag assembly).
Balance ±.05 g tolerance

Procedure

A. Ingredients for 100 gram base mix
1. 100 grams Sylgard 182 resin 6 grams 182 curing agent 15 grams Refrasil F-100-½SiO$_2$ fibers 220 grams Eccospheres Grade Si B. Mixing of SLA-220 material (100 grams base resin mix)
1. In paper cup, weight 100 grams Sylgard 182 resin, add 6 grams Sylgard curing agent and mix by spatula until thoroughly mixed (5 to 10 minutes). (Alternate way, mix in Hobart N-50 for 3 minutes).
2. Place 15 grams SiO$_2$ fibers in Hobart N-50 and spread 110 grams of catalyzed resin uniformly over fibers. Mix for 2 minutes at low speed in Hobart N-50, then 2 minutes at medium speed and 16 minutes at high speed. Mixture should have high viscosity comparable to molasses. Periodically scrape the sides of the mixing bowl to insure uniform mixture (every 3 minutes).
3. In Hobart N-50, mix 220 grams Eccospheres into B2 with spatula for several minutes. Use splash guard on Hobart and mix at low speed for 10 minutes. All material must be thoroughly wet.

C. Method for fabricating SLA-220 into formed blocks by direct pressure.
1. Size or tool governed by part desired. Tool may be made of aluminum and shall consist of a base, removable side walls and a close fitting, yet freely sliding ram.
2. Place suitable quantity of SLA-220 evenly into tool. The weight of material shall be calculated from the area of the mold cavity, the desired height of the part and the nominal density of SLA-220 — (.25 g/cc). Use Mylar separation sheet on bottom of cavity.
3. Tamp material in place by repeatedly applying a force of approximately three pounds across top surface with a 2 × 4 × 10 inches long wooden block. Tamped surface shall be flat and uniform.
4. Place ram on top of material and apply pressure of one to two psi. Remove ram and inspect material to insure that material is evenly tamped and surface is free of voids. Cover top of material with Mylar separation sheet and replace ram.
5. Install tool in oven. Place weights on ram such that pressure on material is 4 psi. Weights should be centered on ram to insure a uniform pressure distribution on the material. Cure for 4 hours at 150° F. and then an additional 16 hours at 200° F.

As an alternate method, the tool can be installed in a heated platen press. The press shall be closed such that a pressure of 4 psi is exerted on the material. The sides of the tool shall be insulated and the material cured in the press for 4 hours at 150° F. and an additional 16 hours at 200° F.
6. After curing, remove SLA-220 from mold by withdrawing ram and removing sides of tool.

D. Method for fabricating SLA-220 into formed blocks by vacuum.
1. Size of tool governed by part desired. Tool may be made of aluminum and shall consist of a base and removable side walls.
2. Same as C2.
3. Same as C3.
4. Using a 1 inch diameter roller 14 inches long, roll over top surface using edges of tool as bearings for roller (insures evenly packed material).
5. Placed additional SLA-220 evenly on top of padded material (weight of additional material shall be calculated from the area of the mold cavity, a height of ⅛ inch and the nominal density of SLA-220, 0.25 g/cc).
6. Vacuum bag part (normal vacuum bag technique) and apply 15 inches Hg. (7.4 ± 1 psi) and cure in oven at 150° F. for 4 hours then an additional 16 hours at 200° F. while under 15 inches Hg. vacuum. Vacuum 15 inches Hg. can be applied by using a tee with a valve on open end of vacuum line and valve adjusted until 15 inches Hg. on gauge remains constant.
7. After curing remove SLA-220 from mold by removing sides of tool.

The density of the cured SLA-220 is 0.25 ± .01 g/cc.

SLA-561 ablator has been evaluated with 5% and 10% curing agent added to the silicon resin. There is no discernable difference in ablative behavior due to curing agent concentration but mechanical properties are sensitive to the amount of curing agent used. Ten percent curing agent yields higher tensile strength but lower elongation than 5 percent curing agent. In general, 10 percent curing agent is preferred. However, the weight and volume percentages for SLA-561 used in Tables IV, VIII and X are based on resin with 5 percent curing agent. SLA-741 is formulated with 10 percent during curing agent and SLA-220 with 6 percent curing agent.

Figure 8:
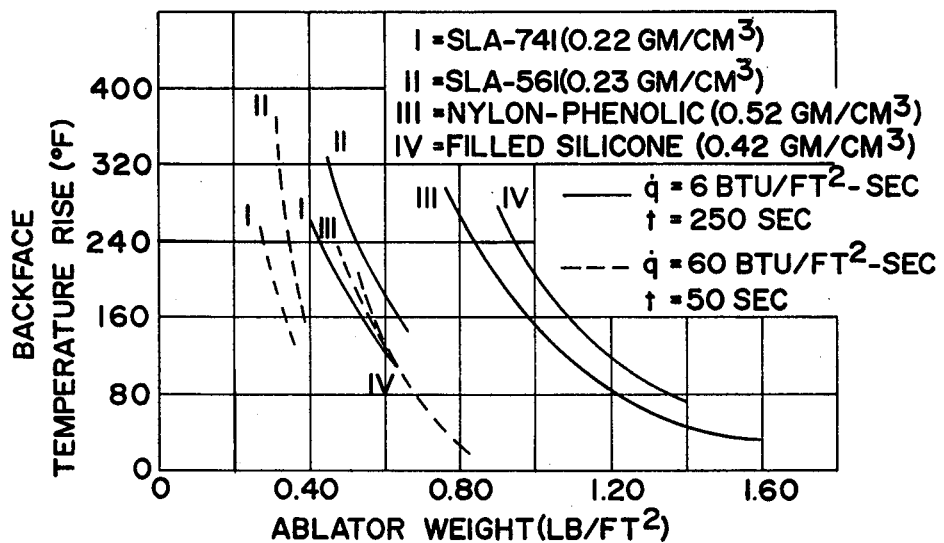
FIG. 8 is a graph illustrating the variation of backface temperature rise with ablator weight.
Figure 9:
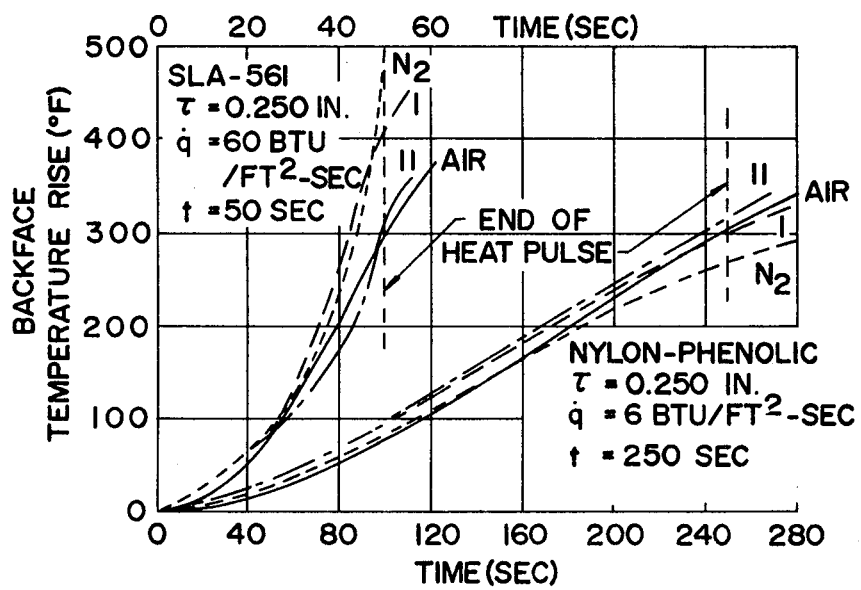
FIG. 9 is a graph illustrating backface temperature response of ablators in various atmospheres.

Ablative testing of SLA-561, SLA-741 and conventional low-density charring controls was conducted in a 200 Kw plasma-arc facility. Heating rates were 6 and 60 Btu/ft$^2$-sec and durations were 250 and 50 sec, respectively, simulating the heat loads of the Mars entry pulses of FIG. 1. Test samples were 2.5 inch diameter disks bonded to cast epoxy bases and instrumented on their backfaces with chromel-alumel thermocouples. Ablators were tested in several thicknesses to establish the variation of backface temperature rise with ablator weight shown in FIG. 8. The curves in FIG. 8 attest to the high efficiency of SLA ablators. Char cracking in the SLA-561 during plasma-arc exposure was slight and less than for filled silicone. FIG. 9 compares the ablative performance of SLA-561 and nylon-phenolic in N$_2$, air, N$_2$ with 28% CO$_2$(1) and 100% CO$_2$(11). No significant differences due to the gaseous environment are noted.

Plasma-arc testing of the SLA ablators at heating rates and dynamic pressures up to 60 Btu/ft$^2$-sec and 0.010 atm (20 psf), respectively, yielded no evidence of char spallation or erosion. To check performance at the higher dynamic pressures to be encountered during a Mars entry, specimens were tested in a hot gas facility. The gas test parameters are set forth in Table XIX.

TABLE XIX
HOT GAS TEST PARAMETERS

|  | I | II | III |
|---|---|---|---|
| Heating rate, Btu/ft²-sec (q) | 6.65 | 22.5 | 42.5 |
| Pulse duration, sec | 250 | 50 | 50 |
| Total heat, Btu/ft² | 1660 | 1125 | 2125 |
| Noise level, db | 100 | 120 | 135 |
| Dynamic pressure, psf (q) | 62.4 | 156 | 345 |

Figure 1:
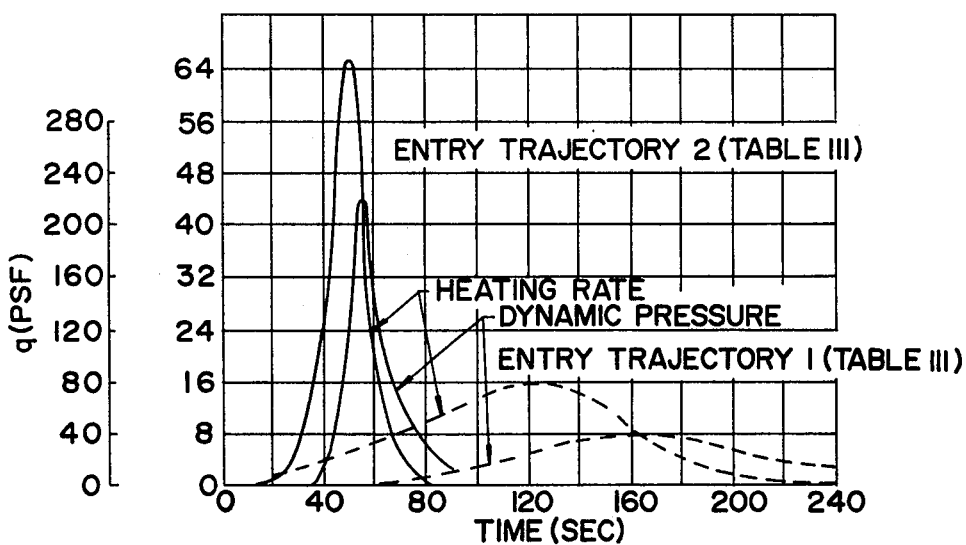
FIG. 1 is a graph illustrating the heating rate and dynamic pressure pulses for Mars entries.
Figure 2:
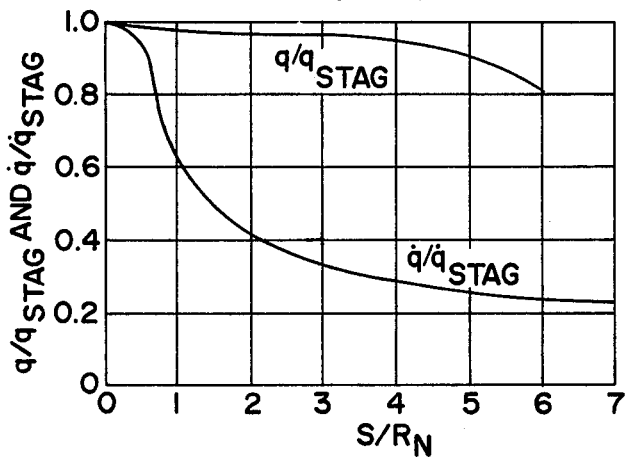
FIG. 2 is a graph illustrating the convective heat-transfer ratio for a 60° blunted cone.

Test environments I and II (Table XIX) are rectangular pulses which approximate the combination of $q$ av and $q$ max of the Mars entry trajectories depicted in FIG. 1. Heat flux and pressure of test environment III are approximately twice those of environment II.

Each specimen consisted of an 11.5 inch diameter layer of SLA ablator, bonded to a 0.035 inch thick aluminum sheet, which was backed by a glass-phenolic honeycomb core. A ½ inch wide band of filled epoxy was cast around the periphery of the specimen to provide edge protection and to insulate the aluminum backup sheet against side heating. SLA-561 and SLA-741 ablator compositions were tested, both with the ablator contained within the cells of an open-faced, glass-phenolic honeycomb core and without the honeycomb support.

Test results revealed char shrinkage and cracking to be more severe with SLA-741 than with SLA-561. SLA-561 suffered no char loss when exposed to test conditions I and II (Table XIX); whereas, SLA-741 eroded when tested at condition II. The use of a honeycomb core significantly reduced surface cracking but failed to alleviate char erosion, both in SLA-741 at test condition II and in SLA-561 at test condition III. Since the pressure environment of the hot gas tests is more severe than that expected in a Mars entry $q$ max was maintained during entire test), and since failure in SLA-561 only occurred at twice the $q$ av and $q$ max of a Mars entry, it is concluded that SLA-561 can withstand a Mars entry pressure and heating environment. SLA-741 is found to be suitable where $q$ is less than 60 psf.

Tensile properties of SLA ablators were determined over the temperature span of +200° to −200° F. Specimens were 9 inches long × 1.5 inches wide (grip ends) × ⅜ inch thick with a ½ inch-wide × 2¼ inch-long gauge section. Samples were instrumented with a 2 inch slide extensometer for optical measurement of elongation. Specimens were held for 1 hour at the test temperature prior to loading. Two SLA-561 formulations, designated "high" and "low" strength, were tested in addition to SLA-741. The two SLA-561 materials differed only in their curing-agent/resin ratios (10 and 5%) and therefore, had similar densities and ablative behavior. Results summarized in Table XX represent the averages of three tests.

TABLE XX
TENSILE PROPERTIES OF SLA ABLATORS

| T, °F. | Tensile Strength, psi SLA-561 High | Tensile Strength, psi SLA-561 Low | SLA-741 | Elongation at Failure, % SLA-561 High | Elongation at Failure, % SLA-561 Low | SLA-741 |
|---|---|---|---|---|---|---|
| +200 | 48 | 26 |  | 2.9 | 3.7 |  |
| +70 | 61 | 35 | 53 | 2.5 | 3.3 | 3.4 |
| −75 | 111 | 59 |  | 2.3 | 3.1 |  |
| −100 | 142 | 72 | 120 | 3.1 | 3.9 | 3.1 |
| −125 | 152 | 83 |  | 3.1 | 4.1 |  |
| −150 | 182 | 114 | 192 | 2.9 | 3.4 | 3.0 |
| −175 | 323 | 258 | 258 | 1.7 | 1.9 | 2.1 |
| −200 | 342 | 329 |  | 0.8 | 0.8 |  |

It is seen that SLA-741 has a slightly lower tensile strength, but a somewhat higher elongation than high-strength SLA-561 which, in turn, is stronger but less flexible than low-strength SLA-561. Differences between the two SLA-561 formulations are significant between +200° and −150° F., but diminish between −150° and −200° F.

Figure 10:
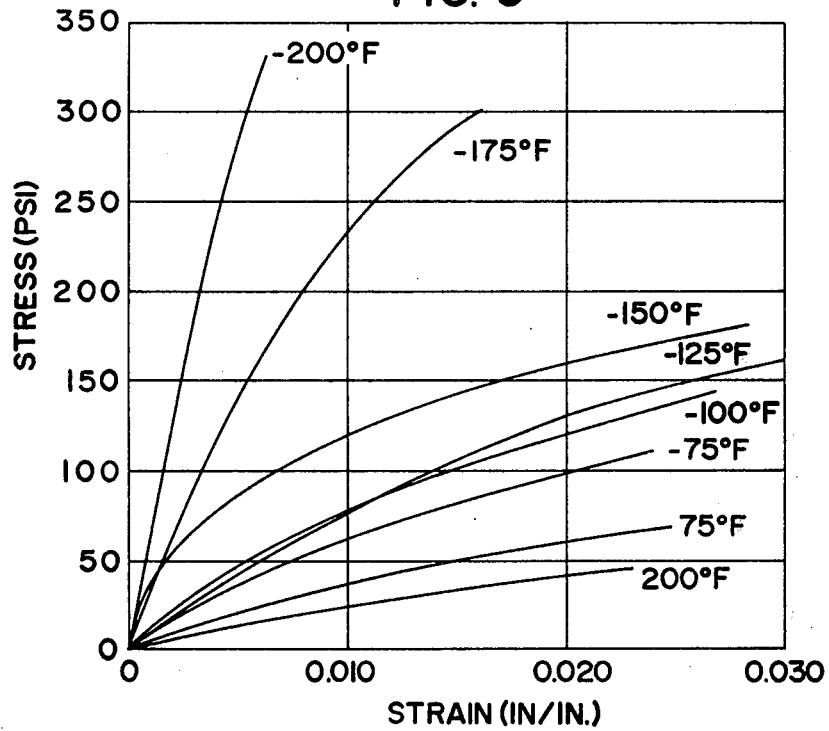
FIG. 10 is a graph illustrating stress-strain curves for high-strength SLA-561.
Figure 11:
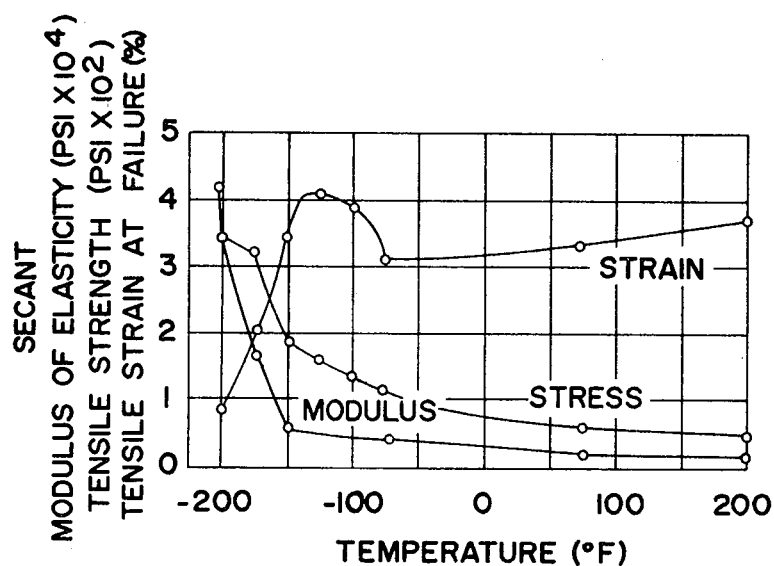
FIG. 11 is a graph illustrating variation of tensile properties of high-strength SLA-561 with temperature.

Stress-strain curves for high-strength SLA-561 (FIG. 10) do not exhibit a straight-line portion from which a true modulus of elasticity can be derived. For design purposes, a modulus value can be determined either as the slope of the line between the origin and the failure point (secant modulus) or as the slope of the stress-strain curve at the origin (tangent modulus). Secant moduli of high-strength SLA-561 are 2420 and 42,800 psi at 70° and −200° F., respectively, while the corresponding tangent modulus values are 3800 and 63,000 psi. FIG. 11 reveals anomalies in the low-temperature mechanical behavior. For example, tensile strain at failure decreases gradually from +200° to −75° F., then increases and peaks at −125° F. before dropping sharply between −150° and −200° F. The 60-psi room temperature tensile strength of high-strength SLA-561 compares favorably with reported strength values of other flexible ablators such as NASA-602 (35 psi) (Ref. C., Table I) or ESM-1004(75psi) (Ref. C., Table I), even though the density of SLA-561 is less than half that of the other materials. The SLA ablators maintain flexibility at −150° F. At −200° F., SLA-561 still maintains an elongation of 0.8%. Since high-strength SLA-561 develops significantly higher room temperature strength than the low-strength formulation without sacrificing appreciable low temperature flexibility, use of the high-strength material is preferred.

Figure 12:
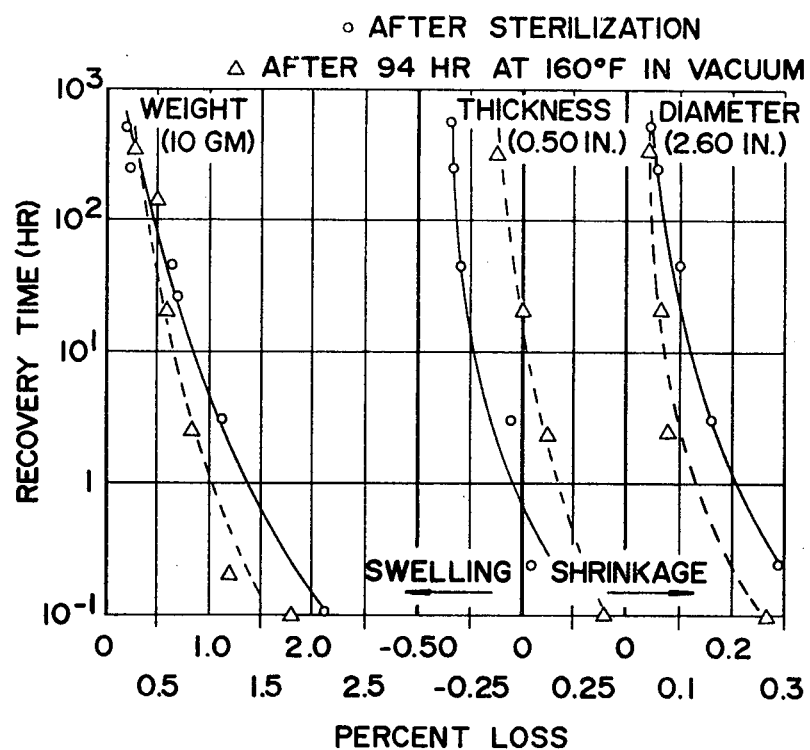
FIG. 12 is a graph illustrating the recovery weight and dimensional changes in SLA-561 after sterilization and after 94 hours of 160° F. in vacuum.

Ablators for planetary landers must be capable of withstanding sterilization (92 hours at 275° F. in $N_2$) and sustained exposure at 160° F. in vacuum. To determine exposure effects, two high-strength SLA-561 disks weighing 10 g each and measuring 2.60 inches in diameter × 0.50 inch thick were subjected to the sterilization cycle and to 94 hours at 160° F. in vacuum, respectively. The samples were weighted and measured upon removal from the environmental chamber, then kept at ambient room conditions and periodically reweighed and measured. As shown in FIG. 12, the samples registered an initial weight loss of approximately 2% and dimensional shrinkage of 0.3 to 0.4%. However, the samples immediately began to regain weight and to relax dimensionally (FIG. 12), and after 300 hours in an ambient environment, specimen weight was only 0.3% below the pre-exposure weight; shrinkage in diameter was approximately 0.05%; and the specimen thickness had actually increased beyond the initial dimension. Based on these tests, it was concluded that the weight change is primarily due to water loss which is regained upon exposure to ambient conditions. Dimensional changes in SLA-561 are of the order of 10% of the tensile elongation and should, therefore, cause no stress buildup or cracking in the ablator.

Figure 13:
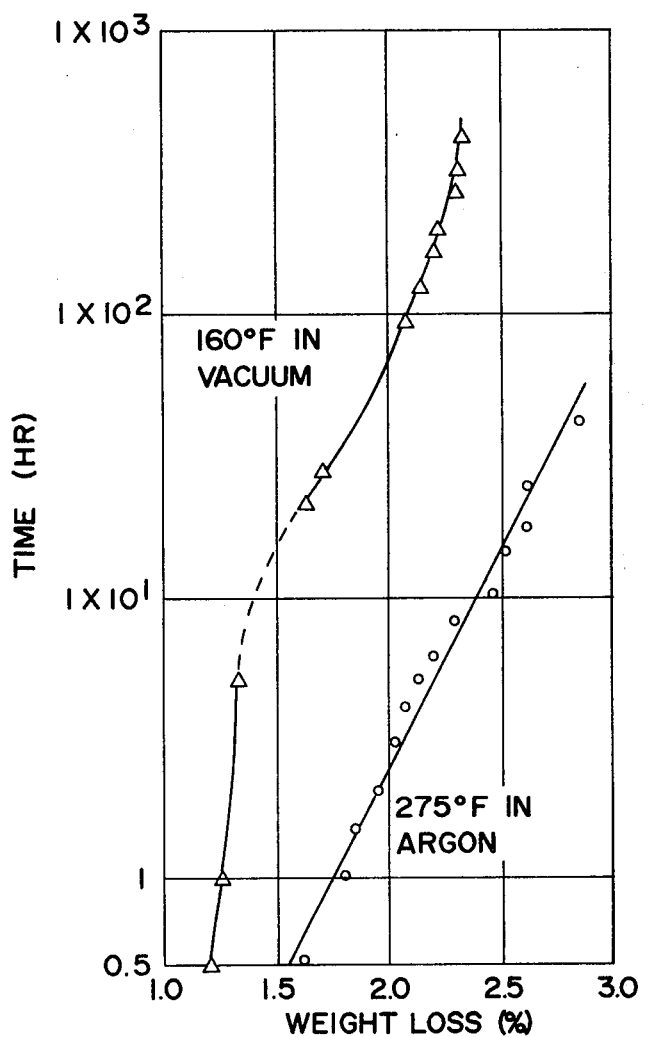
FIG. 13 is a graph illustrating isothermal weight loss of SLA-561.

Weight loss rates during elevated temperature and vacuum exposure were determined for high-strength SLA-361 by isothermal weight loss experiments in thermogravimetric analysis (TGA) apparatus. Weight loss was first measured at 275° F. in argon. A loss of 1.6% occurred between the start of the experiment and temperature stabilization. Thereafter, weight loss vs. time (FIG. 13) can be approximately by percent weight loss = 1.75 + 0.65 log 10$^t$, where $t$ is given in hours. For the 160° F. low-pressure (2.5 to 1-mm Hg) environment, weight loss can be represented on the semilogarithmic plot of FIG. 13 by two curved sections which intersect at approximately 10 hours. The shape of the curve between 10$^2$ and 10$^3$ hours suggests that weight loss at 160° F. in vacuum would not exceed 2.5% even for exposures of 10$^4$ hours.

Figure 14:
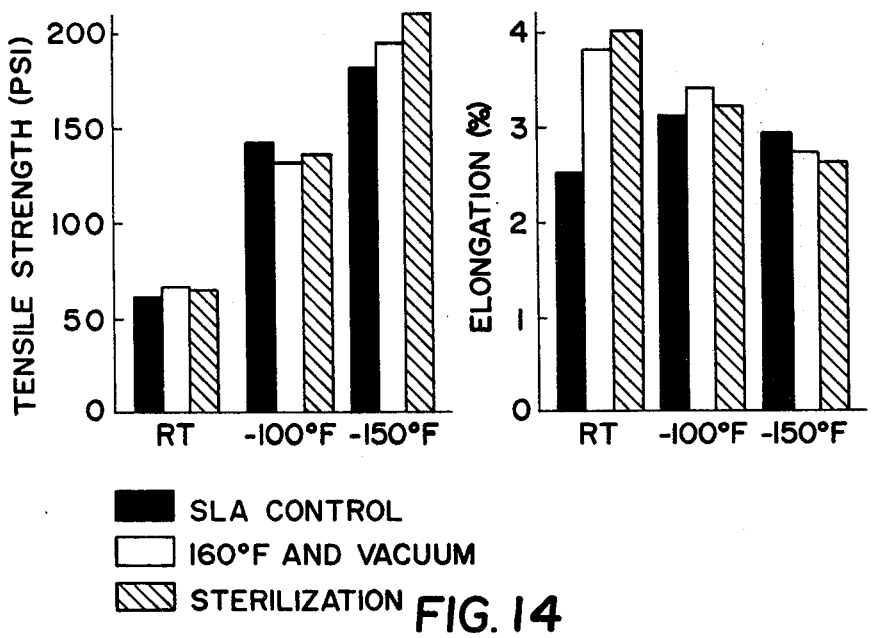
FIG. 14 is a graph illustrating effects of sterilization and elevated temperature-vacuum exposure on tensile properties of SLA-561; and, FIG. 15 is a graph illustrating the relationship between backface temperature rise and ablator weight.

To determine environmental effects on mechanical properties, high-strength SLA-561 samples were tensile tested at 70° room temperature, −100°, and −150° F. after a 336 hours exposure at 160° F. in vacuum and after sterilization. Test procedures were identical to those previously described. Specimens were stored in nitrogen in the interval between exposure and testing. A comparison of tensile strengths and elongations at failure of exposed samples and unexposed controls is shown in FIG. 14. The differences in properties between exposed and unexposed samples are no larger than are accountable by data scatter.

Figure 15:
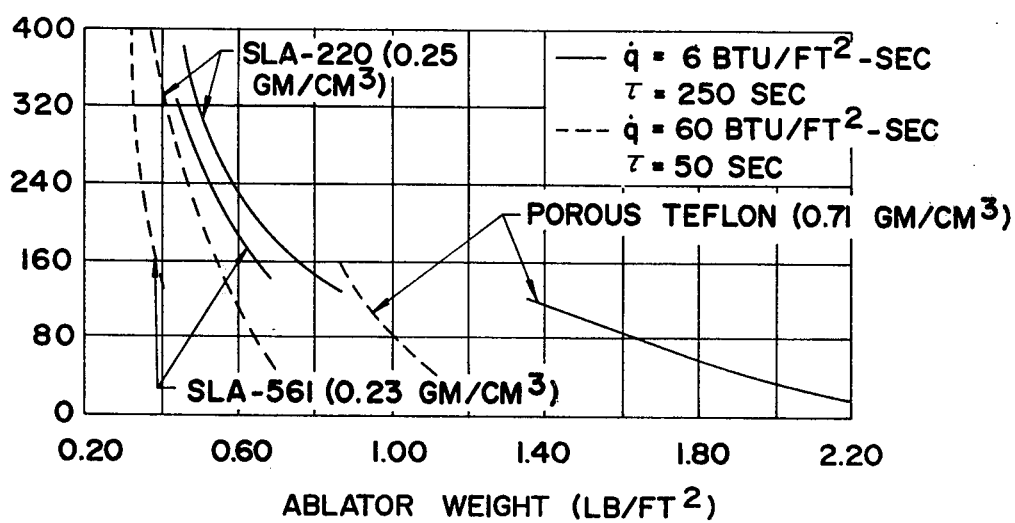

Ablative efficiency of SLA-220 and porous Teflon ablators was checked by plasma-arc testing at 6 and 60 Btu/ft$^2$-sec in a 28% $CO_2$-72%$N_2$ atmosphere. Specimen configuration and instrumentation were as previously described. FIG. 15 compares backface temperature rise of SLA-220 and of 0.71 g/cc porous Teflon with that of SLA-561. For both test conditions, SLA-220 is somewhat less efficient than SLA-561, but significantly more efficient than porous Teflon. SLA-220, as SLA-561, experienced no surface recession under the test conditions employed. The porous Teflon samples, on the other hand, receded 0.23 and 0.25 inches when tested at 6 Btu/ft$^2$-sec (250 sec) and 60 Btu/ft$^2$-sec (50 sec), respectively. Since the backface temperature of porous Teflon does not begin to rise at 60 Btu/ft$^2$-sec until surface recession has progressed through almost the entire thickness of ablator, the design of a porous Teflon heat shield must be based on surface recession as well as on backface temperature rise.

Comparative plasma-arc tests were run on standard SLA-220 samples and on SLA-220 samples scored to a depth of 3/16 inch in a ¼ inch grid pattern. When tested for 250 seconds at 6 Btu/ft$^2$-sec, both types of samples developed a uniform, crack free char surface with a thin carbonaceous char layer. A slight widening of the scoring cuts was noted. When tested for 50 seconds at 60 Btu/ft$^2$-sec, the scored samples developed a uniform char surface while the unscored samples exhibited surface cracking and local separation of the char cap. Heat transfer through scored and unscored samples were equivalent.

Tensile properties of SLA-220 were determined over the temperature span of +200° to −200° F. The test specimen configuration was a dumbbellshaped specimen 1¼ inch wide × 9 inch long × ⅜ inch thick with a ½ inch wide × 2¼ inch long gauge section. Samples were instrumented with a slide wire extensometer and pulled to failure in tension. Elongation was measured optically over a 2 inch gauge section. Samples were soaked for one hour at the test temperature before loading. Samples from two blocks of SLA-220 were tested and they are identified in Table XXI as Series 1 and Series 2. The two series have nearly identical strengths but exhibit different elongations. Tensile strengths increase as temperature decreases from +200° to −125° F., then strength drops between −125° and −150° F. and increases thereafter. Elongation increases as temperature decreases from +200° to −100° F., decreases between −100° and −125° F., increases between −125° and 150° F. and then decreases with decreasing temperature. Elongation is greater than 4% at room temperature and the minimum elongation between −100° and −175° F. (at −125° F.) is greater than 1%. The anomalous strength and elongation characteristics of SLA-220 betweeen −100° and −175° F. are due to the glass transition of the Sylgard 182 silicone resin used in the ablator.

TABLE XXI

| Test Temperature (° F.) | Tensile Strength (psi) Series 1 | Tensile Strength (psi) Series 2 | Elongation % Series 1 | Elongation % Series 2 |
|---|---|---|---|---|
| +200 | 73.2 | — | 5.6 | — |
| Ambient | 83.7 | 81.7 | 6.2 | 5.5 |
| −75 | 113.8 | — | 7.3 | — |
| −100 | 138.3 | — | 6.4 | — |
| −125 | 247.9 | 242.2 | 3.1 | 1.4 |
| −137½ | — | 231.0 | — | 2.5 |
| −150 | 203.5 | 204.0 | 5.3 | 3.1 |
| −175 | — | 281.6 | — | 3.1 |
| −200 | — | 631.0 | — | 0.7 |

In summary, a series of super-light ablative material (SLA) has been developed and tested under conditions simulating the thermal, mechanical and chemical environments of Mars entry. A 0.225 g/cm$^3$ density material designated SLA-561, which contains ground cork, phenolic microballoon, silica microballoon and refractory fiber fillers with an elastomeric silicone binder, develops the best combination of thermal and mechanical properties and meets all mechanical and environmental resistance criteria for Mars entry thermal protection. These perfomance criteria included 1) char erosion resistance at the peak dynamic pressure encountered during Mars entry, 2) low-temperature flexibility to −150° F., and 3) no deterioration due to sterilization and long time exposure in space. In addition SLA-561 displayed 50% higher ablative efficiencies under heat pulses simulating Mars entry than did state-of-the-art, low-density charring ablators such as nylon-phenolic or filled silicone.

A silica char forming ablator (SLA-220), which consists of silicone resin and silica fiber and microsphere fillers, was developed as an RF-transparent ablator. Initial testing indicated that microwave signal attenuation after ablation is less than the allowable value of 3 db. SLA-220 had a 12 to 25% lower ablative efficiency than SLA-561, but it developed a 55 to 60% higher ablative efficiency than porous Teflon.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A low density ablator composition having a density of not greater than 0.25 g/cc for providing ablation protection comprising:
   100 parts by volume of a siloxane elastomer resin selected from the group consisting of methyl-phenyl-vinyl polysiloxane, dimethyl polysiloxane and methyl-phenyl polysiloxane the viscosity of which is equal to or less than 10,000 centipoise; about 1600 to about 1800 parts by volume of a low density filler comprising about 600 to about 900 parts by volume ground cork sized from 0.0165 to 0.0331 inch per 100 parts of resin; from about 500 to 800 parts by volume of hollow silica or glass microspheres sized from 0.0030 to 0.0080 inch per 100 parts of resin; up to about 260 parts by volume of hollow phenolic resin microballoons sized from 0.0030 to 0.0080 inch per 100 parts of resin; up to about 6 parts by volume carbon fibers per 100 parts of resin; and, up to about 6 parts by volume of silica fibers per 100 parts of resin.

2. The composition of claim 1 wherein the low density filler constituents selected from the group consisting of ground cork, silica or glass microspheres and phenolic resin microballoons comprise at least 92% of the ablator volume.

3. The composition of claim 1 wherein the total filler to resin volumetric ratio of the ablator composition is at least about 16 to 1.

4. The composition of claim 1 wherein 90% of the cork weight consists of particles larger than about 0.0234 in. and 90% of the hollow microballoons and microspheres weight consists of particles greater than about 0.0059 in. in diameter.

5. The composition of claim 1 wherein the ratio of hollow microballoons to cork particles is not less than about 0.88 on a volume basis.

6. The composition of claim 1 wherein the volumetric ratio of silica or glass microspheres-to-cork is not less than about 0.60.

7. The composition of claim 1 wherein the distributing of the fillers in the resin-fiber mixture is achieved with low shear mixing equipment.

8. The composition of claim 1 wherein the curing of the mixture takes place at a net pressure of less than about 1 atmosphere.

9. The composition of claim 1 wherein the resulting material forms a virtually crackfree, carbonaceous char during the ablation process.

10. The compositions of claim 1 wherein the tensile elongation of the resulting material is at least 2% at room temperature and at least 1% at −150° F.

11. The composition of claim 1 wherein the volume of the average cork particle is approximately 15 times that of the average phenolic microballoon or silica/glass microsphere particle.

12. The composition of claim 1 wherein the fillers are treated with a silane coupling agent to improve bonding and wetting thereof with the resin.

13. The composition of claim 1 wherein the ablator composition is contained in a honeycomb core.

14. A method of insulating a structure with an ablator composition comprising the steps of: mixing together 100 parts by volume of siloxane resin selected from the group consisting of methyl-phenyl-vinyl polysiloxane, dimethyl polysiloxane and methyl-phenyl polysiloxane the viscosity of which is equal to or less than 10,000 centipoise and about 12 parts by volume of fibers selected from the group consisting of silica and carbon fibers and mixtures thereof; distributing uniformly in the resin-fiber mixture 500 to 800 parts by volume silica or glass microspheres sized from 0.0030 to 0.0080 inch, from about 600 to about 900 parts by volume ground cork sized from 0.0165 to 0.0331 inch and up to 260 parts by volume of phenolic microballoons sized from 0.0030 to 0.0080 inch; forming the resulting mixture into a predetermined configuration between the structure and a region subject to high temperature exposure, and curing the mixture for a time at a temperature sufficient to cure the siloxane resin.

15. The method of claim 14 wherein the low density filler constituents selected from the group consisting of ground cork, silica or glass microspheres, phenolic resin microballoons and mixtures thereof comprise at least 92% of the ablator volume.

16. The method of claim 14 wherein the total filler to resin volumetric ratio of the ablator composition is at least about 16 to 1.

17. The method of claim 14 wherein 90% of the cork weight consists of particles longer than about 0.0234 in. and 90% of the hollow microballoons and microspheres weight consists of particles greater than about 0.0059 in. in diameter.

18. The method of claim 14 wherein the ratio of hollow microspheres and microballoons to cork particles is not less than about 0.88 on a volume of basis.

19. The method of claim 14 wherein the volumetric ratio of silica or glass microspheres-to-cork is not less than about 0.60.

20. The method of claim 14 wherein the distributing of the fillers in the resin-fiber mixture is achieved with low shear mixing equipment.

21. The method of claim 14 wherein the curing of the mixture takes place at a net pressure of less than about 1 atmosphere.

22. The method of claim 14 wherein the density of the resulting composition is not greater than 0.25 g/cc.

23. A low density ablator composition having a density not greater than 0.30 g/cc for providing ablation protection comprising:
100 parts by volume of a siloxane elastomer resin selected from the group consisting of methyl-phenyl-vinyl polysiloxane, dimethyl polysiloxane and methyl-phenyl polysiloxane the viscosity of which is equal to or less than 10,000 centipoise; about 1180 parts by volume of filler comprising about 1175 parts by volume silica or glass microspheres sized from 0.0030 to 0.0080 inch per 100 parts resin; and, from 6 parts silica fibers.

24. The composition of claim 23 wherein the distributing of the fillers in the resin-fiber mixture is achieved with low shear mixing equipment.

25. The composition of claim 23 wherein the curing of the mixture takes place at a net pressure of less than one atmosphere.

26. The composition of claim 23 wherein the resulting material forms a stable, predominantly siliceous char during the ablation process.

27. The composition of claim 23 wherein the density of the resulting material is about 0.25 g/cc.

28. The composition of claim 23 wherein the glass or silica microspheres comprise at least 90% of the ablator volume.

29. The composition of claim 23 wherein the total filler to resin volumetric ratio is at least 11 to 1.

30. The composition of claim 23 wherein the percent of transmission of RF signals through the charred ablator composition is greater than 50%.

31. The composition of claim 23 wherein the tensile elongation of the resulting material is at least 4% at room temperature and at least 1% between −100° F. and −175° F.

32. The composition of claim 23 wherein the fillers are treated with a silane coupling agent to improve bonding and wetting thereof with the resin.

33. The composition of claim 23 wherein the ablator composition is contained in a honeycomb core.

34. A method of insulating a structure with an ablator composition comprising the steps of: mixing together 100 parts by weight of siloxane resin selected from the group consisting of methyl-phenyl-vinyl polysiloxane, dimethyl polysiloxane and methyl-phenyl polysiloxane the viscosity of which is equal to or less than 10,000 centipoise and about 5 to 10 parts by volume of silica fibers; distributing uniformly in the resin-fiber mixture about 1000 to 1300 parts by volume silica or glass microspheres sized from 0.0030 to 0.0080 inch; forming the resulting mixture into a predetermined configuration between the structure and a region subject to high temperature exposure; and curing the mixture for a time and at a temperature sufficient to cure the siloxane.

35. The method of claim 34 wherein the distributing of the fillers in the resin-fiber mixture is achieved with low shear mixing equipment.

36. The method of claim 34 wherein the curing of the mixture takes place at a net pressure of less than one atmosphere.

37. The method of claim 34 wherein the resulting material forms a stable, predominantly siliceous char during the ablation process.

38. The method of claim 34 wherein the density of the resulting material is about 0.25 g/cc.

39. The method of claim 34 wherein the glass or silica microspheres comprise at least 90% of the ablator volume.

40. The method of claim 34 wherein the total filler to resin volumetric ratio is at least 11 to 1.

41. The method of claim 34 wherein the presence of transmission of RF signals through the charred ablator composition is greater than 50%.

42. The method of claim 34 wherein the tensile elongation of the resulting material is at least 4% at room temperature and at least 1% between −100° F. and −175° F.

43. The method of claim 34 wherein the fillers are treated with a silane coupling agent to improve bonding and wetting thereof with the resin.

44. The method of claim 34 wherein the ablator composition is contained in a honeycomb core structure.

45. The method of claim 34 wherein the surface of the resulting ablator configuration is scored in two orthogonal directions to compensate for char shrinkage during ablation.

46. A method of insulating a structure with an ablator composition comprising the steps of: mixing together 100 parts by weight of siloxane resin selected from the group consisting of methyl-phenyl-vinyl polysiloxane, dimethyl polysiloxane and methyl-phenyl siloxane and about 6 parts by volume of silica fibers; distributing uniformly in the resin-fiber mixture 1175 parts by volume silica or glass microspheres sized from 0.0030 to 0.0080 inch; forming the resulting mixture into a predetermined configuration between the structure and a region subject to high temperature exposure; and, curing the mixture for a time and at a temperature sufficient to cure the siloxane resin;
   wherein the viscosity of the siloxane resin is equal to or less than about 10,000 centipoise;
   wherein the distributing of the silica or glass microspheres is achieved with low shear mixing equipment; and,
   wherein the curing of the mixture takes place at a net pressure of less than about 1 atmosphere.

* * * * *